Patented Nov. 20, 1928.

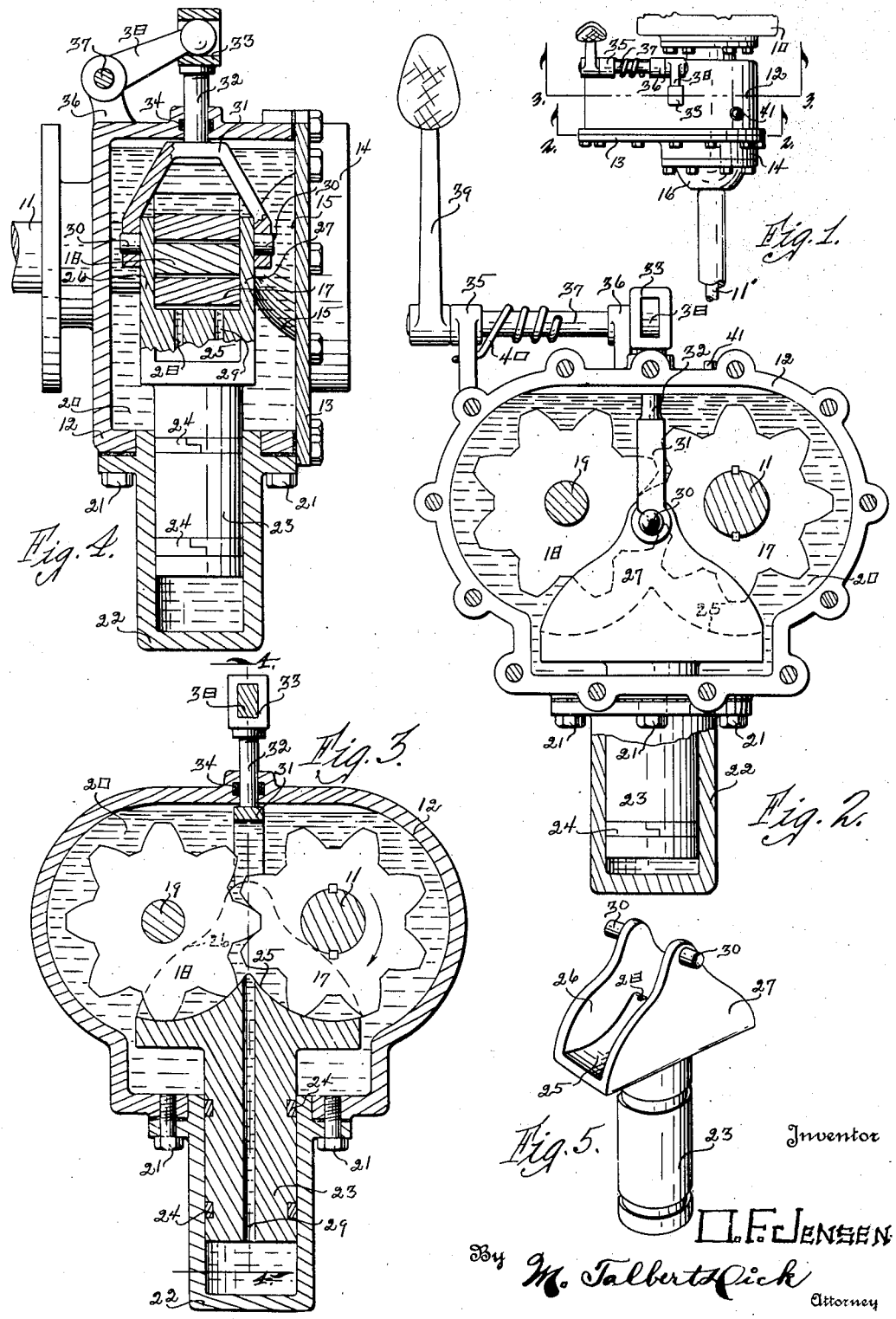

1,692,801

UNITED STATES PATENT OFFICE.

OLUF FRED JENSEN, OF COUNCIL BLUFFS, IOWA.

FLUID BRAKE FOR ROTATING SHAFTS.

Application filed October 24, 1927. Serial No. 228,299.

The principal object of this invention is to provide a fluid brake for rotating shafts that is economical in manufacture, durable and simple in construction and efficient in use.

More specifically, the object of this invention is to provide a brake for automobiles and the like by restricting or preventing the circulating of a fluid that is in operative engagement with the drive shaft of the vehicle.

A still further object is to provide a fluid brake for rotating shafts that requires no power when not in use.

A still further object is to provide a fluid brake for rotating shafts that is completely inclosed in a housing and protected from any foreign matter entering its mechanism.

A still further object is to provide a fluid brake that requires no adjustment once it is properly installed.

A still further object is to provide a brake for vehicles and the like that has few moving parts and is not subject to wear in any degree when not in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Fig. 1 is a top plan view of my device installed on the drive shaft of a vehicle and ready for use.

Fig. 2 is an enlarged end sectional view taken on line 2—2 of Fig. 1 and shows my device in normal position when not in use.

Fig. 3 is an enlarged end sectional view taken on line 3—3 of Fig. 1 and shows my device in operative position when in use.

Fig. 4 is a side sectional view of my invention taken on line 4—4 of Fig. 3 and more fully illustrates its interior construction.

Fig. 5 is a perspective view of the shield embracing member and piston used in my fluid brake.

Hydraulic or fluid brakes for rotating shafts that have heretofore been designed are very complicated. Almost without exception, they comprise mainly, the gear housing having two meshing spur gears rotatably mounted therein and substantially filling the inside of the housing. A pipe leads from the housing at a point above the point where the two gears mesh and re-enters the housing at a point below the meshing point of the gears. By this arrangement the spur gears are continually forcing substantially all of the fluid through the pipe when the shaft is not being retarded or stopped by the closing of a valve in the pipe. This type of hydraulic brake has many advantages over the piston type that requires constant inspection and minute adjustment, but their chief disadvantage is that power is required to circulate the fluid through the pipe whenever the shaft is rotating. This continual circulating of a limited amount of fluid through a small pipe produces friction and the oil therefore soon heats. This heating is especially experienced when the shaft is being retarded by partially closing the valve. I have overcome these difficulties as will be appreciated by those skilled in the art.

I have designated the ordinary transmission case of the vehicle by the numeral 10 and the transmission shaft leading therefrom by the numeral 11. The numeral 12 designates the housing of my device secured to the transmission case by suitable means having the rear cover lid 13. This lid is secured to the housing proper by suitable means and has integrally formed on its face the collar 14, which is part of the universal joint socket 15. This socket with the retaining member 16 secured by suitable means to the collar 14 houses the universal joint, not shown. Permanently secured to the shaft 11 and inside the housing 12 is a spur gear 17. This spur gear is in mesh with a second spur gear 18 loosely mounted on a shaft 19 secured inside the housing 12. It should here be noted that considerable space exists between the spur gears 17 and 18 and the side walls of the housing 12. Most of this space is designed to be occupied by a suitable fluid, such as oil and which is designated by the numeral 20. Secured by the cap screws 21 to the bottom of this housing 12 and communicating with the inside of the same is the cup or cylinder member 22, as shown in Fig. 3. Slidably mounted in the bore of this cylinder is a piston 23 having the piston rings 24. Integrally formed on the top of this piston 23 is a shield embracing member designed to closely house the lower teeth of the two spur gears and points where they mesh when the piston is raised to an operative position as shown in Fig. 3. This shield embracing member consists of a bottom 25, having a form of two curved surfaces concentric with the peripheral edge of the two said spur gears respectively. The numerals 26 and 27 designate side flanges or walls designed to extend on each side of the spur gears, as shown in Fig. 4 when the device is in an operative position. These side walls also partially embrace the sides of the spur gears when the device is not in an operative position thereby maintaining sufficient fluid adjacent the oncoming teeth of the spur gears at all times for instant use. Extending from the highest point in the bottom 25 and through the piston, are two small passageways 28 and 29. Extending outwardly and laterally from the upper portion of each of the side walls 26 and 27 is a trunnion 30. Engaging each of these trunnions and extending around and above the point where the two spur gears mesh is the U-shaped member 31. Having one end integrally formed to the top of this U member and extending through a hole in the top of the housing 12, is a rod 32 having an eye member 33 threaded onto its free end. The numeral 34 designates a gasket embracing the rod 32 at a point where it passes through the housing 12 for preventing leakage of the fluid in the housing. The numerals 35 and 36 designate bearing members integrally formed on top of the housing 12, as shown in Fig. 2. Rotatably mounted in these bearing members is a shaft 37 having one end permanently secured to the arm 38. The free end of this arm extends into the eye member 33 and makes proper engagement therewith. Permanently secured on the other end of the shaft 37 is an ordinary foot pedal 39.

Having one end secured to the shaft 37 and its other end engaging the bearing member 35 is the coil spring 40 designed to yieldingly hold the arm 38 in a downward position. The numeral 11' designates the drive shaft leading from the universal joint 15.

By the above described construction, if the shaft 11 is rotated to the right the spur gears 17 and 18 will be smoothly and easily turning in the housing with only the negligent resistance of two gears running in a vat of oil. The fluid carried by the teeth of the gears readily escapes to the side or downwardly as they mesh with each other. However, if the pedal 39 is pushed upwardly the embracing shield member will be drawn up adjacent and around the lower teeth and the place where they mesh and the fluid escaping from the teeth as they mesh will be proportionately restricted and a braking action will be effected on the shaft 11. If the embracing shield is raised completely, the fluid in the oncoming teeth cannot escape and as the gears cannot mesh unless this fluid escapes, the shaft 11 will be locked against any rotation. The desire of this trapped fluid to escape when the embracing shield member is being raised or maintained in an operative position is so great on the bottom of the embracing member that some means must be provided to compensate for the same, for otherwise, it would be almost impossible to raise the embracing member any distance. To overcome this pressure, I have provided the two passageways 28 and 29 leading through the piston 23. By this arrangement, a certain amount of the fluid under pressure will enter the cylinder at the back of the piston 23 and will exert a like pressure in the opposite direction or in other words, will have a tendency to force the embracing shield member upwardly and around the spur gears. The piston 23 also acts as a guide for the embracing shield member. When the pressure is released from the pedal 39 the spring 40 will return the embracing shield member back to normal inoperative position, as shown in Fig. 2. When the shaft 11 is rotated to the left, the brake will operate in the same manner, but will not be as efficient, as in this case the braking action will be a suction rather than a pressure.

Suitable gaskets should be used throughout the device to prevent leakage of the fluid in the housing 12. This fluid should last indefinitely, but if it should get low, it is merely necessary to remove the filling cap 41 and place a new supply in the housing 12.

This construction of an oil fluid brake permits the spur gears 17 and 18 to be comparatively wide, as shown in Fig. 4. They may be also of various sizes.

Although I have shown my fluid brake in combination with a vehicle, it may be used for braking purposes on any rotating shaft.

If it is desired, more than two spur gears with more than one embracing shield may be used.

Some changes may be made in the construction and arrangement of my improved fluid brake without departing from the real spirit and purpose of my invention and it is my intention to cover by my claims any modified forms of structure or use of mechanical equivalents which may be reasonably included within their scope.

I claim:

1. In combination with a rotating shaft, a brake comprising a housing, a spur gear permanently secured to said shaft and inside said housing, a second spur gear rotatably mounted in said housing and meshing with said first mentioned spur gear, a fluid in said gear housing, and a means for partially or totally housing the lower portions of said spur gears.

2. In combination with a rotating shaft, a gear housing, a spur gear permanently secured to said shaft and inside said gear housing, a second spur gear rotatably mounted in said housing and in engagement with said first mentioned spur gear, a fluid in said housing, and a shield embracing member capable of being moved to a point adjacent said two spur gears.

3. In combination with a vehicle having a shaft in operative engagement with some of its wheels, a gear housing, a spur gear permanently secured to said housing, a second spur gear rotatably mounted inside said housing and in engagement with said first mentioned spur gear, a fluid inside said housing, and a slidably mounted embracing shield in said housing.

4. In combination with a rotating shaft, a brake comprising a gear housing, a spur gear permanently secured to said shaft and inside said housing, a second spur gear rotatably mounted in said gear housing and in engagement with said first mentioned spur gear, an embracing shield member slidably mounted in said housing, and a rod having one end secured to said embracing member and passing through said housing for manually actuating said embracing member.

5. In combination with a rotating shaft, a gear housing, a spur gear permanently secured to said shaft and inside said housing, a second spur gear rotatably mounted in said housing and in engagement with said first mentioned spur gear, a fluid inside said housing, and an embracing shield member slidably mounted in said housing having a bottom of two surfaces concentric with said two spur gears respectively.

6. In combination with a rotating shaft, a brake comprising a gear housing, a spur gear permanently secured to said shaft and inside said housing, a second spur gear rotatably mounted in said housing and in engagement with said first mentioned spur gear, a fluid inside said housing, and an embracing shield member slidably mounted in said housing having two side flanges designed to extend on both sides of said spur gears at a point where they mesh when said embracing shield member is moved to an operative position.

7. In combination with a rotating shaft, a brake comprising a gear housing, a spur gear permanently secured to said shaft and inside said gear housing, a second spur gear rotatably mounted in said housing and in engagement with said first mentioned spur gear, a fluid in said housing, a cylinder secured to said housing and communicating with the inside of the same, a piston slidably mounted in said cylinder, an embracing shield in said housing and secured to said piston, and a means for actuating said piston.

8. In combination with a rotating shaft, a brake comprising a gear housing, a spur gear permanently secured to said shaft and inside said gear housing, a second spur gear rotatably mounted in said housing and in engagement with said first mentioned spur gear, a fluid in said housing, a cup member secured to and communicating with the inside of said housing, a piston slidably mounted in said cup member, an embracing shield member integrally formed on the end of said piston, a passageway leading through said piston and embracing member, and a means for reciprocating said piston.

9. In combination with a rotating shaft, a brake comprising a gear housing, a spur gear permanently secured to said shaft and inside said gear housing, a second spur gear rotatably mounted in said housing and in engagement with said first mentioned spur gear, a fluid in said housing, a piston slidably mounted in said housing, an embracing shield member integrally formed on one end of said piston capable of embracing the lower portions and meshing teeth of said spur gears when said piston is in an operative position, and a means for yieldingly holding said piston out of an operative position.

OLUF FRED JENSEN.